United States Patent
Oya et al.

(10) Patent No.: US 11,139,481 B2
(45) Date of Patent: Oct. 5, 2021

(54) REDOX FLOW BATTERY ELECTRODE, AND REDOX FLOW BATTERY

(71) Applicant: Sumitomo Electric Industries, Ltd., Osaka (JP)

(72) Inventors: Masayuki Oya, Osaka (JP); Kenichi Ito, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 133 days.

(21) Appl. No.: 16/482,521

(22) PCT Filed: Nov. 15, 2017

(86) PCT No.: PCT/JP2017/041021
§ 371 (c)(1),
(2) Date: Jul. 31, 2019

(87) PCT Pub. No.: WO2018/142716
PCT Pub. Date: Aug. 9, 2018

(65) Prior Publication Data
US 2020/0403248 A1 Dec. 24, 2020

(30) Foreign Application Priority Data
Jan. 31, 2017 (JP) ............................ JP2017-015046

(51) Int. Cl.
| H01M 4/86 | (2006.01) |
| H01M 4/96 | (2006.01) |
| H01M 8/18 | (2006.01) |

(52) U.S. Cl.
CPC .......... *H01M 4/8626* (2013.01); *H01M 4/96* (2013.01); *H01M 8/18* (2013.01); *H01M 2004/8689* (2013.01)

(58) Field of Classification Search
None
See application file for complete search history.

(56) References Cited

U.S. PATENT DOCUMENTS

2017/0207475 A1* 7/2017 Ito ........................ H01M 4/8605

FOREIGN PATENT DOCUMENTS

| JP | 63-2261 A | 1/1988 |
| JP | 2002-246035 A | 8/2002 |
| JP | 2011-153384 A | 8/2011 |
| JP | 2016-211029 A | 12/2016 |

* cited by examiner

*Primary Examiner* — Daniel S Gatewood
(74) *Attorney, Agent, or Firm* — Baker Botts L.L.P.; Michael A. Sartori

(57) ABSTRACT

A redox flow battery electrode includes an aggregate of a base containing carbon. When, on a cross section of the base, a circle that is centered at a center of gravity of the base and that has a diameter which is 95% of an isoarea equivalent circle diameter of the base is defined as a reference circle, the base includes a plurality of penetrating holes which extend from a surface toward an interior of the base and whose paths along extension directions of the penetrating holes are partially present within the reference circle.

20 Claims, 4 Drawing Sheets

112:112a, 112b, 112c, 112d

REDOX FLOW BATTERY ELECTRODE, AND REDOX FLOW BATTERY

TECHNICAL FIELD

The present invention relates to a redox flow battery electrode and a redox flow battery.

The present application claims priority from Japanese Patent Application No. 2017-15046 filed on Jan. 31, 2017, and the entire contents of the Japanese patent application are incorporated herein by reference.

BACKGROUND ART

PTL 1 discloses a redox flow battery configured to supply a pair of electrodes (a positive electrode and a negative electrode) disposed on both sides of a membrane with electrolytes (a positive electrolyte and a negative electrolyte) and to perform charging and discharging by an electrochemical reaction (a battery reaction) on the electrodes. An aggregate of carbon fibers is used as each of the electrodes.

CITATION LIST

Patent Literature

PTL 1: Japanese Unexamined Patent Application Publication No. 2002-246035

SUMMARY OF INVENTION

A redox flow battery electrode according to the present disclosure is a redox flow battery electrode including an aggregate of a base containing carbon, in which when, on a cross section of the base, a circle that is centered at a center of gravity of the base and that has a diameter which is 95% of an isoarea equivalent circle diameter of the base is defined as a reference circle, the base includes a plurality of penetrating holes which extend from a surface toward an interior of the base and whose paths along extension directions of the penetrating holes are partially present within the reference circle.

A redox flow battery according to the present disclosure is a redox flow battery that performs charging and discharging by supplying a positive electrolyte and a negative electrolyte to a battery cell that includes a positive electrode, a negative electrode, and a membrane disposed between the positive electrode and the negative electrode, in which the positive electrode is the redox flow battery electrode according to the present disclosure.

DESCRIPTION OF EMBODIMENTS

Figure 1:
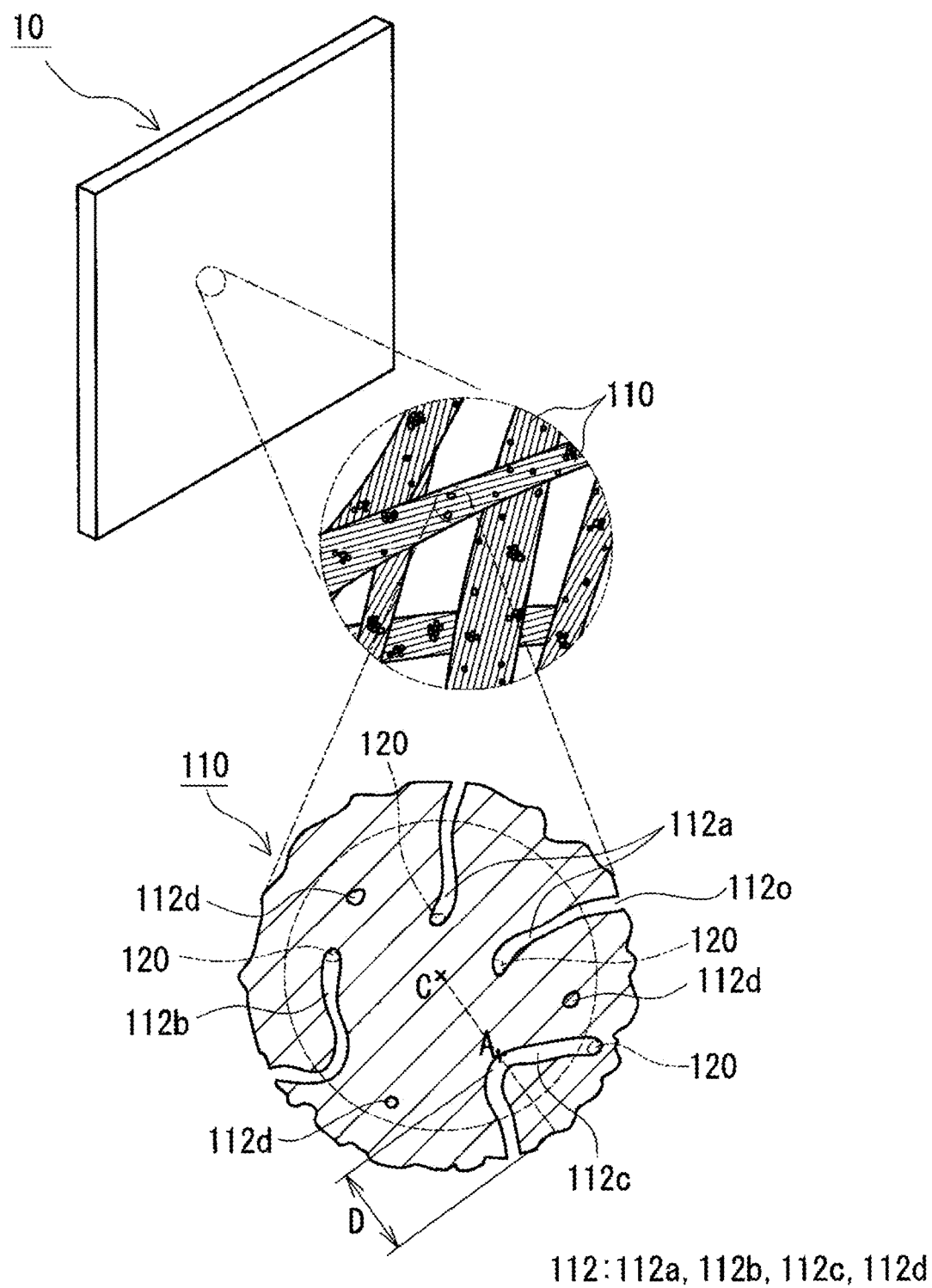
FIG. 1 is a schematic view illustrating an electrode included in a redox flow battery according to an embodiment.

Problems to be Solved by Present Disclosure

It is desirable for redox flow batteries to achieve stable performance for a long period of time. In the operation of redox flow batteries for a long period of time, the use of an aggregate of carbon fibers as a positive electrode causes degradation of the carbon fibers by oxidation in an electrolyte, which may result in an increase in the internal resistance.

In view of this, an object is to provide a redox flow battery electrode capable of constructing a redox flow battery having a low internal resistance for a long period of time. Another object is to provide a redox flow battery having a low internal resistance for a long period of time.

Advantageous Effects of Present Disclosure

The redox flow battery electrode described above can construct a redox flow battery having a low internal resistance for a long period of time. The redox flow battery described above has a low internal resistance for a long period of time.

DESCRIPTION OF EMBODIMENTS OF PRESENT INVENTION

In order to improve reaction activity of a redox flow battery (hereinafter, also referred to as an "RF battery"), a study has been conducted in which an uneven structure is provided on a surface of a base constituting an electrode (a carbon fiber when the electrode is formed of an aggregate of carbon fibers) by performing a roughening treatment or the like. This is because the uneven structure of the surface of the base increases the surface area to increase the reaction site where a battery reaction is performed. However, it has been found that when a simple uneven structure is merely formed on the surface of the base, in the operation of the RF battery for a long period of time, the surface is eroded with the degradation of the base over time, the uneven structure disappears, and the surface area decreases, resulting in an increase in the internal resistance.

In view of this, the inventors of the present invention have conducted studies on a configuration capable of suppressing a decrease in the surface area of a base with time in the operation of an RF battery for a long period of time. According to the results, it has been found that, in the case where a recess is formed by a penetrating hole that reaches a central region of the base (when the base is formed of a carbon fiber, a region near the center of the axis of the carbon fiber), even if the surface is eroded with the degradation of the base over time, the ratio of decrease in the surface area is low, and thus the internal resistance can be made low for a long period of time. The present invention has been made based on the finding described above. Hereafter, the contents of embodiments of the present invention will be listed and described.

(1) A redox flow battery electrode according to an embodiment of the present invention is a redox flow battery electrode including an aggregate of a base containing carbon, in which when, on a cross section of the base, a circle that is centered at a center of gravity of the base and that has a diameter which is 95% of an isoarea equivalent circle diameter of the base is defined as a reference circle, the base includes a plurality of penetrating holes which extend from a surface toward an interior of the base and whose paths along extension directions of the penetrating holes are partially present within the reference circle.

Since the base that forms the electrode includes a plurality of penetrating holes, the surface area can be increased compared with the case where no penetrating holes are provided on the surface of the base, and thus the initial internal resistance can be reduced. A path of each of the penetrating holes, the path extending along a direction in which the penetrating hole extends from the surface toward the interior of the base, is partially present in the interior of the base. Therefore, even when the surface is eroded by degradation of the base over time, a part of the penetrating hole, the part being present inside the base, remains. This remaining part of the penetrating hole can reduce the ratio of decrease in the surface area of the base. Accordingly, since the base includes a plurality of penetrating holes extending from the surface toward the interior of the base, it is possible to construct a redox flow battery having a low internal resistance from the initial operation of the RF battery over a long period of time. The term "cross section of a base" means a section perpendicular to a longitudinal direction of a base.

(2) According to an embodiment of the redox flow battery electrode, the base includes a carbon fiber having the cross section with an isoarea equivalent circle diameter of 3 µm or more and 100 µm or less.

When the electrode is formed of an aggregate of a carbon fiber, electrical conductivity is easily enhanced by increasing the number of contact points of the carbon fiber, and flowability of an electrolyte is easily enhanced by reliably providing gaps in the electrode. When the isoarea equivalent circle diameter of the carbon fiber is 3 µm or more, strength of the aggregate of the carbon fiber is easily and reliably obtained. On the other hand, when the isoarea equivalent circle diameter of the carbon fibers is 100 µm or less, the aggregate of the carbon fiber can have a large surface area of the carbon fiber per unit weight, and a sufficient battery reaction can be performed.

(3) According to an embodiment of the redox flow battery electrode, at least one of the plurality of penetrating holes has an opening on the surface of the base, the opening having an isoarea equivalent circle diameter of 50 nm or more and 2,000 nm or less.

When the isoarea equivalent circle diameter of the opening of the penetrating hole is 50 nm or more, durability when the weight per unit area is decreased is easily maintained. On the other hand, when the isoarea equivalent circle diameter of the opening of the penetrating hole is 2,000 nm or less, strength of the base is easily and reliably obtained.

(4) According to an embodiment of the redox flow battery electrode, the redox flow battery electrode has a BET specific surface area of 0.1 m²/g or more.

The term "BET specific surface area" refers to a specific surface area determined by a gas adsorption method (BET method: a method for measuring a specific surface area using the BET equation derived by Brunauer, Emmett, and Teller). When the BET specific surface area is 0.1 m²/g or more, a sufficient battery reaction can be performed.

(5) According to an embodiment of the redox flow battery electrode, the redox flow battery electrode has a capacitance of 0.05 F/g or more.

When the capacitance is 0.05 F/g or more, the oxidation-reduction potential of an active material can be increased, and a redox flow battery having a high electromotive force can be constructed. In such a redox flow battery having a high electromotive force, a positive electrode is easily degraded by oxidation due to a side reaction along with charging and discharging, and thus the effect obtained by using the redox flow battery electrode according to this embodiment as the positive electrode is easily exerted.

(6) According to an embodiment of the redox flow battery electrode, at least one of the plurality of penetrating holes has a metal oxide at a bottom thereof.

The penetrating holes can be formed by a metal oxide adhering to a surface of a base in a process for producing an electrode (which will be described in detail below in a method for producing an electrode). Therefore, the metal oxide that has formed a penetrating hole may remain at the bottom of the penetrating hole. In some types of metals that form the metal oxide and some forms of use of an electrode (for example, the type of electrolyte), even when the metal oxide remains at the bottom of the penetrating holes, the metal oxide does not affect the performance of the redox flow battery. In such a case, a step of removing the metal oxide can be omitted to achieve good productivity of the electrode.

(7) A redox flow battery according to an embodiment of the present invention is a redox flow battery that performs charging and discharging by supplying a positive electrolyte and a negative electrolyte to a battery cell that includes a positive electrode, a negative electrode, and a membrane disposed between the positive electrode and the negative electrode, in which the positive electrode is the redox flow battery electrode according to any one of (1) to (6) above.

Since the redox flow battery includes, as the positive electrode, the redox flow battery electrode according to an embodiment of the present invention, the redox flow battery has a low internal resistance from the initial operation of the RF battery for a long period of time.

Details of Embodiments of Present Invention

Hereafter, an electrode included in a redox flow battery (RF battery) according to an embodiment of the present invention and an RF battery including the electrode will be described in detail with reference to the drawings.

[Outline of RF Battery]

Figure 2:
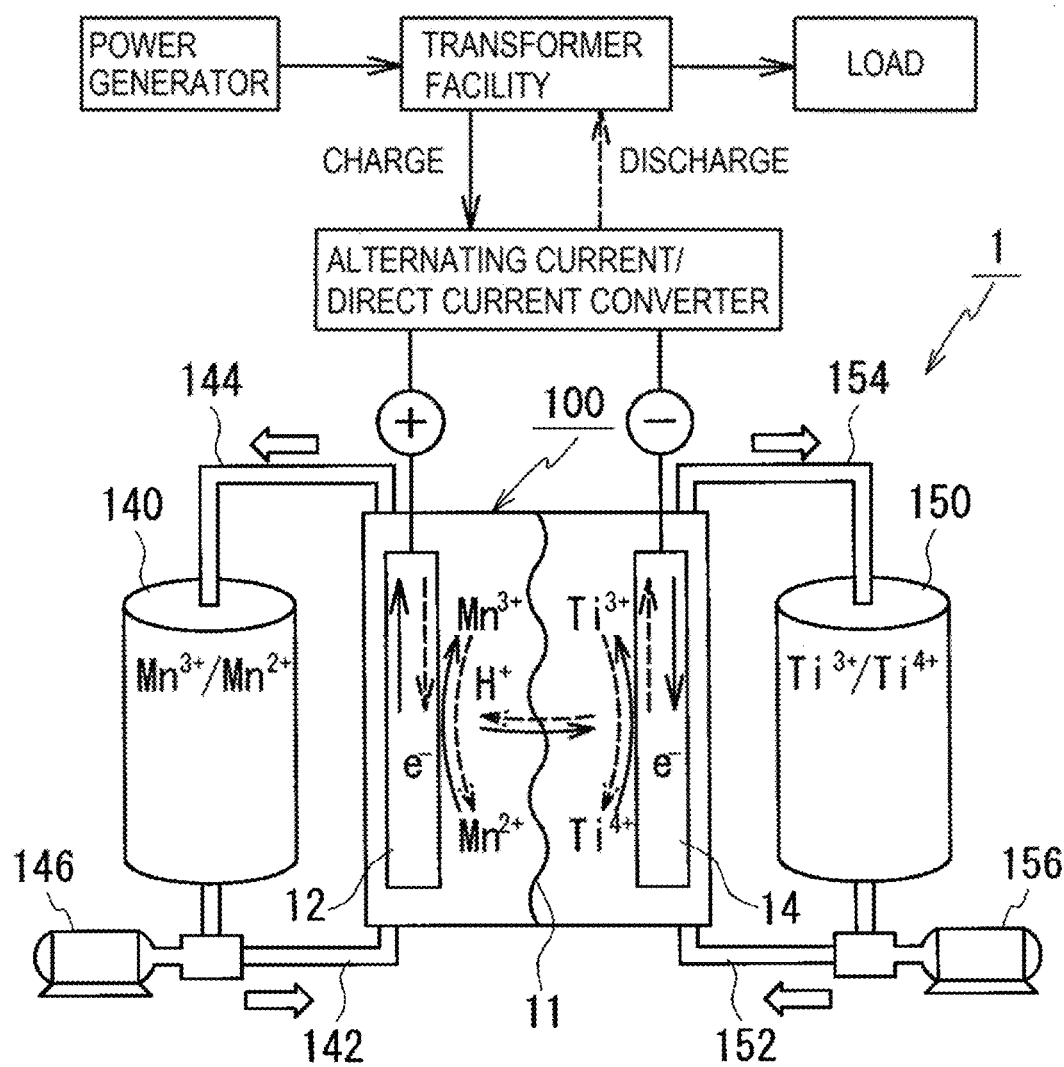
FIG. 2 is a schematic principle diagram of a redox flow battery according to an embodiment.

As illustrated in FIG. 2, an RF battery 1 includes a battery cell 100 and circulation mechanisms that circulate and supply electrolytes to the battery cell 100. Typically, the RF battery 1 is connected, through an alternating current/direct current converter, a transformer facility, and the like, to a power generation unit and a load such as a power system or a consumer, performs charging using the power generation unit as a power supply source, and performs discharging to the load as a power supply target. Examples of the power generation unit include solar photovoltaic power generators, wind power generators, and other general power plants.

[Basic Configuration of RF Battery]

The battery cell 100 includes a positive electrode 12 to which a positive electrolyte is supplied, a negative electrode 14 to which a negative electrolyte is supplied, and a membrane 11 disposed between the positive electrode 12 and the negative electrode 14. Each of the positive electrode 12 and the negative electrode 14 is a reaction site in which active material ions contained in the supplied electrolyte conduct a battery reaction. The membrane 11 is a separation member that separates the positive electrode 12 and the negative electrode 14 from each other and that allows predetermined ions to permeate therethrough.

A circulation mechanism for a positive electrolyte includes a positive electrolyte tank 140 that stores a positive electrolyte, pipes 142 and 144 that connect the positive electrolyte tank 140 and the battery cell 100, and a pump 146 provided on the pipe 142 on the upstream side (supply side). A circulation mechanism for a negative electrolyte includes a negative electrolyte tank 150 that stores a negative electrolyte, pipes 152 and 154 that connect the negative electrolyte tank 150 and the battery cell 100, and a pump 156 provided on the pipe 152 on the upstream side (supply side).

The positive electrolyte is supplied from the positive electrolyte tank 140 through the pipe 142 on the upstream side to the positive electrode 12 and returned from the positive electrode 12 through the pipe 144 on the downstream side (discharge side) to the positive electrolyte tank 140. The negative electrolyte is supplied from the negative electrolyte tank 150 through the pipe 152 on the upstream side to the negative electrode 14 and returned from the negative electrode 14 through the pipe 154 on the downstream side (discharge side) to the negative electrolyte tank 150. While the positive electrolyte is circulated and supplied to the positive electrode 12 and the negative electrolyte is circulated and supplied to the negative electrode 14 by means of circulation of the positive electrolyte and the negative electrolyte, charging and discharging are performed in response to valence-change reactions of active material ions in the positive and negative electrolytes. In FIG. 2, manganese ions and titanium ions shown inside the positive electrolyte tank 140 and the negative electrolyte tank 150, respectively, are examples of ion species contained as active materials in the positive electrolyte and the negative electrolyte. In FIG. 2, the solid-line arrows indicate charging, and the dashed-line arrows indicate discharging.

The RF battery 1 is typically used in the form of a configuration referred to as a cell stack in which a plurality of battery cells 100 are stacked. Each of the battery cells 100 is formed by using a cell frame that includes a bipolar plate (not shown) having a positive electrode 12 on one surface thereof and a negative electrode 14 on the other surface thereof and a frame body (not shown) formed on an outer periphery of the bipolar plate. The frame body has liquid supply holes through which electrolytes are supplied and liquid drainage holes through which the electrolytes are discharged. By stacking a plurality of cell frames, the liquid supply holes and the liquid drainage holes form flow channels for the electrolytes. The flow channels are connected to the pipes 142, 144, 152, and 154. The cell stack is formed by repeatedly stacking a cell frame, a positive electrode 12, a membrane 11, a negative electrode 14, a cell frame, and so on in this order.

A known configuration can be appropriately used for the basic configuration of the RF battery 1.

[Main Feature of RF Battery]

One feature of the RF battery 1 according to an embodiment is the use of an electrode capable of constructing an RF battery 1 having a low internal resistance for a long period of time. Specifically, the electrode is formed of an aggregate of bases containing carbon, and the bases each include a plurality of penetrating holes extending from the surface toward the interior. This electrode is the positive electrode 12 or the negative electrode 14 described above and hereinafter described an electrode 10 (FIG. 1).

<<Electrode>>

The electrode 10 is formed of an aggregate of a plurality of carbon fibers (bases 110) as illustrated in FIG. 1. FIG. 1 illustrates an electrode 10, the middle part is a partial enlarged view of the electrode 10, and the lower part is an enlarged cross-sectional view of each base 110 that forms the electrode 10. The base 110 includes a plurality of penetrating holes 112 extending from the surface toward the interior of the base 110, as illustrated in the lower part of FIG. 1. In the lower part of FIG. 1, the shapes, the sizes, and the like of a path of each of the penetrating holes 112, the path extending along an extension direction of the penetrating hole 112, are exaggeratedly illustrated for the sake of convenience of explanation.

Base

The bases 110 are carbon fibers and form a fiber aggregate (electrode 10) in which a plurality of carbon fibers are entangled together. A ratio of fibers in the fiber aggregate varies depending on the structure of the bases 110 (the form of combination of the fibers). The ratio of the bases 110 in the fiber aggregate (electrode 10) is 30% by mass or more, and further 50% by mass or more. The fiber aggregate is formed of carbon fibers alone or formed of carbon fibers and a component other than carbon fibers. Examples of the component other than carbon fibers include carbonized binders. Examples of the fiber aggregate include carbon felt and carbon cloth (formed of carbon fibers alone) and carbon paper (formed of carbon fibers fixed by a carbonized binder). Commercially available products and fiber aggregates produced by known production methods can be used as the fiber aggregates.

The carbon fibers that form the bases 110 have a degree of graphitization of 1.4 or less in terms of an R value, which is a ratio ($R=I_{1360}/I_{1580}$) of a peak intensity ($I_{1360}$) at a wavenumber of approximately 1,360 cm$^{-1}$ to a peak intensity ($I_{1580}$) at a wavenumber of approximately 1,580 cm$^{-1}$ as determined by Raman spectroscopic analysis. When the R value of the degree of graphitization of the carbon fibers is 1.4 or less, the bases 110 are unlikely to be degraded by oxidation. The R value of the degree of graphitization of the carbon fibers is further 1.0 or less, and in particular 0.5 or less.

The carbon fibers that form the bases 110 each have a cross section having an isoarea equivalent circle diameter of 3 µm or more and 100 µm or less. The isoarea equivalent circle diameter of a carbon fiber refers to, on a cross section of a carbon fiber, a diameter of a circle having an area equal to the sectional area of the carbon fiber. When the isoarea equivalent circle diameter of the carbon fiber is 3 µm or more, the strength of the fiber aggregate is easily secured. On the other hand, when the isoarea equivalent circle diameter of the carbon fiber is 100 µm or less, the electrode 10 can have a large surface area of the fiber per unit weight, and the battery reaction is easily performed. The isoarea equivalent circle diameter of the carbon fiber is further 5 µm or more and 50 µm or less, and in particular 7 µm or more and 20 µm or less. The isoarea equivalent circle diameter in a cross section of carbon fibers that form bases 110 can be determined by cutting the electrode 10 to expose cross sections of carbon fibers, conducting measurement with a microscope in five viewing fields or more and for three or more carbon fibers with respect to one viewing field, and averaging the measurement results. Examples of the cross-sectional shapes of the carbon fibers (bases 110) include a circular shape and polygonal shapes such as a rectangular shape, a triangular shape, and a star shape.

The porosity of the fiber aggregate formed of the bases 110 is more than 40% by volume and less than 98% by volume. When the porosity of the fiber aggregate is more than 40% by volume, flowability of electrolytes is easily improved. On the other hand, when the porosity of the fiber aggregate is less than 98% by volume, the fiber aggregate has a high density to improve electrical conductivity, and a sufficient battery reaction can be performed. The porosity of the fiber aggregate formed of the bases 110 is further 60% by volume or more and 95% by volume or less, and in particular 70% by volume or more and 93% by volume or less.

Penetrating Hole

The base 110 includes a plurality of penetrating holes 112 extending from the surface toward the interior of the base 110, as illustrated in the lower part of FIG. 1. One feature of the electrode 10 used in the RF battery 1 according to an embodiment lies in that a path along the extension direction of a penetrating hole 112 is partially present in a central region of a base 110. The central region of the base 110 refers to an inner region of a circle (the circle indicated by the dotted line in the lower part of FIG. 1) on a cross section of the base 110, the circle having a center C which is a center of gravity of the base 110 and having a diameter which is 95% of the isoarea equivalent circle diameter of the base 110 (hereinafter, this circle is referred to as a "reference circle"). The center of gravity of a region surrounded by the outline of the cross section of the base 110 is determined by, for example, image-processing a photograph of a section of the base 110.

Each of the penetrating holes 112 has an opening 112o on the surface of the base 110, continuously extends from the opening 112o toward the interior, and is similar to a so-called wormhole. The extension direction of each of the penetrating holes 112 is not particularly limited. Some of the penetrating holes 112 linearly extend, and some of the penetrating holes 112 extend in a meandering manner. Accordingly, when a cross section of the base 110 is viewed, examples of the penetrating holes 112 that are present include a penetrating hole 112a extending in a direction approaching the center C of the base 110, a penetrating hole 112b extending in a direction away from the center C of the base 110 in the course of extension, and a penetrating hole 112c that returns in the course of extension and extends in an external direction, as illustrated in the lower part of FIG. 1. The penetrating holes 112 also meander in the longitudinal direction of the base 110. In such a case, when the cross section of the base 110 is viewed, the penetrating holes 112 are cut in a direction intersecting the extension direction thereof and thus the penetrating holes 112 look like cavities (cavities denoted by 112d in the lower part of FIG. 1).

In a penetrating hole 112, the path along the extension direction of the penetrating hole 112 is partially present within the reference circle. Specifically, a path extending from a halfway position to the bottom of the penetrating hole 112 in the extension direction may be present within the reference circle (penetrating holes 112a and 112b), or a halfway part of a path of the penetrating hole 112 in the extension direction may be present within the reference circle (penetrating hole 112c). In the case of a penetrating hole extending while meandering in the longitudinal direction of the base 110, the penetrating hole 112d that looks like a cavity when a cross section of the base 110 is viewed may be present within the reference circle.

Preferably, a part of the path of each of the penetrating holes 112 is present in a direction approaching the center C of the base 110. That is, the penetrating holes 112 are preferably present within a reference circle having a diameter that is 90%, further, 80%, and in particular 70% of the isoarea equivalent circle diameter of the base 110. With this structure, even if the surface of the base 110 is significantly eroded by degradation over time, disappearance of the penetrating holes 112 can be suppressed, and the ratio of decrease in the surface area of the base 110 can be further reduced.

The plurality of penetrating holes 112 may be present independently from each other or present to communicate with each other. Such independent penetrating holes 112 and communicating penetrating holes 112 may coexist. The penetrating holes 112 may be present so as to extend through the base 110. Typical forms of the penetrating holes 112 are as follows. In the case of a hole that does not extend through the base 110, the hole has an opening 112o on the surface of the base 110, a bottom, and a sidewall portion connecting the opening 112o and the bottom. In the case of a hole that extends through the base 110, the hole has an opening 112o on one end and an opening 112o on the other end, the openings 112o being formed on the surface of the base 110, and a sidewall portion connecting the two openings 112o.

In a penetrating hole 112, the isoarea equivalent circle diameter of an opening 112o on the surface of a base 110 is 50 nm or more and 2,000 nm or less. The isoarea equivalent circle diameter of an opening 112o refers to, in an opening 112o on the surface of a base 110, a diameter of a circle having an area equal to the area of the opening 112o. When the isoarea equivalent circle diameter of the opening 112o of the penetrating hole 112 is 50 nm or more, durability in the case of a decrease in the weight per unit area is easily maintained. On the other hand, when the isoarea equivalent circle diameter of the opening 112o of the penetrating hole 112 is 2,000 nm or less, the strength of the base 110 is easily secured. The isoarea equivalent circle diameter of the opening 112o of the penetrating hole 112 is further 100 nm or more, and in particular 300 nm or more. The isoarea equivalent circle diameter of an opening 112o on the surface of a base 110 is determined by averaging measurement results obtained in surface observation with a scanning electron microscope (SEM) in three viewing fields or more and for 20 or more openings with respect to one viewing field. Examples of the opening shapes of the openings 112o of the penetrating holes 112 include a circular shape and polygonal shapes such as a rectangular shape, a triangular shape, and a star shape.

Metal Oxide

The penetrating holes 112 of the base 110 may have a metal oxide 120 at the bottom thereof. The penetrating holes 112 of the base 110 can be formed by the metal oxide 120 adhering to the surface of the base 110 in a process for producing an electrode 10 (which will be described in detail below in a method for producing an electrode). Therefore, the metal oxide 120 that has formed penetrating holes 112 may remain at the bottom of the penetrating holes 112. Examples of the metal element that forms the metal oxide 120 include iron (Fe), zirconium (Zr), cobalt (Co), tungsten (W), and nickel (Ni). The metal oxide 120 contains at least one metal element selected from the above metal elements. When the metal oxide 120 contains a plurality of metal elements selected from the above metal elements, the metal oxide 120 is present in the form of oxides (such as $Fe_2O_3$ and $ZrO_2$) of each metal element or a complex oxide (such as (Fe, Zr)O) containing the plurality of metal elements.

In some types of metals that form the metal oxide 120 and some forms of use of the electrode 10 (for example, the type of electrolyte), the absence of the metal oxide 120 is preferred. This is because when the electrode 10 in a state where the metal oxide 120 remains is used in the RF battery 1, there may be a problem in that, for example, the metal oxide 120 dissolves in an electrolyte, reacts with an electrolyte component to generate precipitation. In such a case, the metal oxide 120 can be removed after the formation of the penetrating holes 112 (which will be described in detail below in the method for producing an electrode). Specifically, a state where no metal oxide 120 is present in the electrode 10 can be realized. In contrast, there are cases where the presence of the metal oxide 120 is preferred and cases where no problem occurs even when the metal oxide 120 is present. The presence or absence of the metal oxide 120 can be appropriately selected depending on the type of metal that forms the metal oxide 120, the type of electrolyte, and the like.

<<Method for Producing Electrode>>

The above-described electrode 10 for an RF battery is obtained by, for example, performing a preparation step of preparing a base 110 and a coating liquid containing a specific metal, an application step of applying the coating liquid to a surface of the base 110, and a heat treatment step of heat-treating the base 110 to which the coating liquid is applied. By applying the coating liquid to the base 110 and conducting heat treatment, penetrating holes 112 that extend from the surface toward the interior of the base 110 can be formed in the base 110. In the case where the absence of a metal component (metal oxide 120) is preferred as the electrode 10, a removal step of removing the metal oxide 120 adhering to the base 110 is performed. A method for producing an electrode 10 for an RF battery will now be described in detail.

Step of Preparing Base

A fiber aggregate in which a plurality of carbon fibers are entangled together is prepared as a base 110. The size and the shape of the fiber aggregate are appropriately selected so as to obtain a size and a shape of a desired electrode 10. One condition for forming penetrating holes 112 in the base 110, the penetrating holes 112 extending from the surface toward the interior, is that a fiber aggregate constituted by carbon fibers having a degree of graphitization of 1.4 or less, the degree of graphitization being an R value determined by Raman spectroscopic analysis, is used as the base 110. When the R value of the degree of graphitization is 1.4 or less, in the heat treatment step described below, penetrating holes 112 can be formed only in portions where a metal oxide 120 adheres to the base 110 while suppressing degradation by oxidation in portions where the metal oxide 120 does not adhere to the base 110. Preferably, the R value of the degree of graphitization of the carbon fibers is further 1.0 or less, and in particular 0.5 or less.

Step of Preparing Coating Liquid

A coating liquid containing a raw material of a specific metal element, such as Fe, Zr, Co, W, or Ni, and a solvent is prepared as a coating liquid. Examples of the raw material of the specific metal element include metal chlorides such as iron(II) chloride tetrahydrate, zirconium tetrachloride, tungsten hexachloride, cobalt(II) chloride hexahydrate, and nickel(II) chloride hexahydrate; metal sulfates such as $NiSO_4$ and $CoSO_4$; and organometallic complexes. Examples of the solvent used in the coating liquid include water, ethanol, methanol, propyl alcohol, isopropanol, butanol, pentanol, and hexanol.

One condition for forming penetrating holes 112 in the base 110, the penetrating holes 112 extending from the surface toward the interior, is that a concentration of the specific metal element in the coating liquid is 0.005% by mass or more and 3% by mass or less. The concentration of the metal element in the coating liquid can be measured by ICP (inductively coupled plasma emission spectrometry). The concentration of the specific metal element tends to affect the particle size of the metal oxide 120 generated in the heat treatment step described below. Therefore, when the concentration of the specific metal in the coating liquid is in the above range, a metal oxide 120 having a desired size can be generated on the base 110, and penetrating holes 112 corresponding to the size of the metal oxide 120 can be formed in the heat treatment step described below. In particular, with an increase in the concentration of the specific metal in the coating liquid, the metal oxide 120 to be generated agglomerates more easily in the heat treatment step described below. When the metal oxide 120 agglomerates, the metal oxide 120 erodes the base 110 in the agglomeration state, and thus the sizes of the penetrating holes 112 are easily increased. Preferably, the concentration of the specific metal element in the coating liquid is further 0.01% by mass or more and 2.5% by mass or less, 0.05% by mass or more and 2.3% by mass or less, 0.07% by mass or more and 2% by mass or less, and in particular 0.1% by mass or more and 1.5% by mass or less.

The coating liquid may contain, as a surfactant, a silicon-based surfactant, a fluorine-based surfactant, a cationic surfactant, an anionic surfactant, or the like. When the coating liquid contains a surfactant, the surfactant is preferably contained in the coating liquid in an amount of 0.05% by mass or more and 3% by mass or less.

Alternatively, a coating liquid containing metal nanoparticles (where the type of metal is the same as that of the above specific metal element) and water or an organic solvent may be used as the coating liquid.

Application Step

The coating liquid is applied to the surface of the fiber aggregate (formed of base 110). Examples of the application method include a dip-coating method, a brush coating method, an atomizing method, a flow coating method, and a roll coating method. One condition for forming penetrating holes 112 in the base 110, the penetrating holes 112 extending from the surface toward the interior, is that an amount of coating is 0.1 $g/m^2$ or more and 30 $g/m^2$ or less. The amount of coating of the coating liquid tends to affect the number of portions of the metal oxide 120 generated in the heat treatment step described below. Therefore, when the amount of coating of the coating liquid is in the above range, a desired number of portions of the metal oxide 120 can be generated on the base 110 in the heat treatment step described below, and penetrating holes 112 corresponding to the number of the portions of the metal oxide 120 can be formed. In particular, with an increase in the amount of coating, the metal oxide 120 is more easily uniformly generated on the surface of the base 110, and the penetrating holes 112 are more easily uniformly formed over the whole of the base 110. Preferably, the amount of coating of the coating liquid is further 0.5 $g/m^2$ or more and 10 $g/m^2$ or less, and in particular 1 $g/m^2$ or more and 5 $g/m^2$ or less.

After the application of the coating liquid to the fiber aggregate, drying of the solvent is performed (for example, at about 150° C.).

Heat Treatment Step

The fiber aggregate to which the coating liquid is applied is heat-treated in an oxygen-containing atmosphere. The heat treatment conducted in an oxygen-containing atmosphere generates a metal oxide 120 on the base 110, and the metal oxide 120 is eroded toward the interior of the base 110. Thus, penetrating holes 112 extending from the surface toward the interior of the base 110 can be formed. Preferably, the oxygen-containing atmosphere has an oxygen concentration of 1% by volume or more, further 5% by volume or more, and in particular 10% by volume or more. In the case of the air atmosphere, the atmosphere is easily controlled, and good workability is achieved. Of course, the atmosphere may be an atmosphere having a higher oxygen content than the air.

One condition for forming penetrating holes 112 in the base 110, the penetrating holes 112 extending from the surface toward the interior, is a heat treatment temperature of 400° C. or higher and 800° C. or lower. The heat treatment temperature tends to affect the extension direction of each of the penetrating holes 112 and the length (depth) in the extension direction. Therefore, when the heat treatment temperature is within the above range, the metal oxide 120 can be eroded to the central region of the base 110 (within the reference circle on a cross section of the base 110). That is, penetrating holes 112 reaching the central region of the base 110 can be formed. Preferably, the heat treatment temperature is further 450° C. or higher and 750° C. or lower, and in particular 500° C. or higher and 700° C. or lower.

One condition for forming penetrating holes 112 in the base 110, the penetrating holes 112 extending from the surface toward the interior, is a heat treatment time of 30 minutes or more and 10 hours or less. The heat treatment time tends to affect the extension direction of each of the penetrating holes 112 and the length (depth) in the extension direction as in the heat treatment temperature. Therefore, when the heat treatment time is within the above range, the metal oxide 120 can be eroded to the central region of the base 110 (within the reference circle on a cross section of the base 110). That is, penetrating holes 112 reaching the central region of the base 110 can be formed. Preferably, the heat treatment time is further 1 hour or more and 7 hours or less, and in particular 1 hour or more and 5 hours or less.

The heat treatment temperature and the heat treatment time are preferably a low temperature for a long time within the above ranges. The heat treatment at a low temperature for a long time easily extends penetrating holes 112 without significant meandering when the metal oxide 120 erodes in the base 110 from the surface toward the central region of the base 110.

Removal Step

In the electrode 10 obtained in the heat treatment step, the metal oxide 120 may remain at the bottom of the penetrating holes 112, as illustrated in the lower part of FIG. 1. The metal oxide 120 can be removed by being dissolved or by subjecting the electrode 10 to an acid washing treatment. An example of the acid washing treatment is an immersion in a washing liquid (for example, hydrochloric acid, hydrofluoric acid, or the like) for about 0.1 hours or more and 2 hours or less. After the metal oxide is removed with the washing liquid, washing is performed with ultrapure water, and drying is performed.

Alternatively, the above-described electrode 10 for an RF battery is obtained by forming in advance holes in PAN-based (polyacrylonitrile-based) fibers before carbonization, and subsequently carbonizing the PAN-based fibers. Alternatively, holes can be formed by dissolving two immiscible polymers in a solvent compatible with the polymers to form fibers, and subsequently dissolving one of the polymers in the fibers with a solvent. For example, fibers in which PVP (polyvinylpyrrolidone) is dispersed in PAN are formed such that the PAN functions as a base of the fibers, and only PVP is then dissolved with a solvent to thereby obtain PAN-based fibers having holes.

<<Advantages>>

In the electrode 10 for an RF battery according to an embodiment, a base 110 includes penetrating holes 112 which extend from the surface toward the interior of the base 110 and whose paths along extension directions of the penetrating holes 112 are partially present within a central region (reference circle) of the base 110. Therefore, the electrode 10 can have a BET specific surface area of 0.1 m$^2$/g or more. When the BET specific surface area is 0.1 m$^2$/g or more, a sufficient battery reaction can be performed. Since the paths along the extension directions of the penetrating holes 112 are partially present within the central region (reference circle) of the base 110, the ratio of decrease in the surface area of the base 110 can be reduced even when the base 110 is degraded over time. Accordingly, the use of this electrode 10 enables the construction of an RF battery 1 having a low internal resistance from the initial operation for a long period of time and enables the construction of a stable RF battery 1.

In particular, the electrode 10 for an RF battery according to an embodiment can be suitably used as the positive electrode 12 (FIG. 2). When an aggregate of carbon fibers is used as each of the positive electrode 12 and the negative electrode 14 (FIG. 2) as in the related art, in the operation of the RF battery 1 for a long period of time, the positive electrode (carbon fiber) is degraded by oxidation due to a side reaction along with charging and discharging, which tends to increase the internal resistance. The use of the electrode 10 for an RF battery 1 according to an embodiment as the positive electrode can suppress an increase in the internal resistance because even when carbon fibers are degraded by oxidation, the ratio of decrease in the surface area is small. Accordingly, the capacitance of the electrode 10 can be made high, namely, 0.05 F/g or more. Since the capacitance is 0.05 F/g or more, the oxidation-reduction potential of an active material can be increased, and an RF battery 1 having a high electromotive force can be constructed. In such an RF battery 1 having a high electromotive force, the positive electrode is easily degraded by oxidation due to a side reaction along with charging and discharging, and thus the effect obtained by using the electrode 10 for an RF battery according to an embodiment as the positive electrode is easily exerted.

<<Others>>

Electrolyte

The electrolyte used in the RF battery 1 contains active material ions such as metal ions or non-metal ions. Examples thereof include a manganese-titanium-based electrolyte containing manganese (Mn) ions as a positive electrode active material and titanium (Ti) ions as a negative electrode active material (refer to FIG. 2). Other examples of the electrolyte include a vanadium-based electrolyte containing vanadium ions having different valences as a positive electrode active material and a negative electrode active material, and an iron-chromium-based electrolyte containing iron (Fe) ions as a positive electrode active material and chromium (Cr) ions as a negative electrode active material. As the electrolyte, for example, an aqueous solution containing, in addition to the active materials, at least one acid or acid salt selected from the group consisting of sulfuric acid, phosphoric acid, nitric acid, hydrochloric acid, and salts thereof can be used. The positive electrolyte and the negative electrolyte preferably contain active materials having an oxidation-reduction potential of 0.9 V or more. When the active materials have an oxidation-reduction potential of 0.9 V or more, an RF battery 1 having a high electromotive force can be constructed. In such an RF battery 1 having a high electromotive force, the positive electrode 12 (FIG. 2) is easily degraded by oxidation due to a side reaction along with charging and discharging, and thus the effect obtained by using the electrode 10 for an RF battery according to the embodiment as the positive electrode 12 is easily exerted.

<<Use>>

The electrode 10 for an RF battery according to an embodiment can be suitably used as an electrode of the RF battery 1. The RF battery 1 according to an embodiment can be used as a large-capacity storage battery, with respect to natural energy power generation, such as solar photovoltaic power generation or wind power generation, for the purpose of stabilizing fluctuation of power output, storing generated power during oversupply, leveling load, and the like. The RF battery 1 according to an embodiment can be provided in a general power plant and suitably used as a large-capacity storage battery as countermeasures against momentary voltage drop/power failure and for the purpose of leveling load.

Experimental Example

An electrode that included a base containing carbon and having penetrating holes was prepared, and a cell resistivity was examined to evaluate a change with time.

[Preparation of Samples]

Sample Nos. 1-1 to 1-6

Carbon paper formed of carbon fibers having an R value of the degree of graphitization of 0.35 was prepared as a fiber aggregate of a base containing carbon. The carbon paper has a fiber diameter (isoarea equivalent circle diameter) of 8 μm, a size of 30 mm×30 mm, a thickness of 0.2 mm, a porosity of 65% by volume, and a weight per unit area of 120 g/m$^2$. Coating liquids were prepared by dissolving iron(II) chloride tetrahydrate in ethanol so as to have an iron concentration of 1% by mass in sample Nos. 1-1 and 1-3 to 1-6 and an iron concentration of 0.1% by mass in sample No. 1-2. Regarding sample Nos. 1-3 to 1-6, surfactants shown in Table 1 were added to the coating liquids in an amount of 0.5% by mass. Each of the coating liquids was applied to the base by a dip coating method, and dried at 150° C. until the organic solvent was removed. Subsequently, firing was performed in the air under the heat treatment conditions shown in Table 1.

Sample No. 1-7

Iron oxide nanoparticles (average particle size: 6 nm) were applied to the same base as that used in sample No. 1-1 and then fired in the air at 650° C. for 1 hour.

Sample No. 1-11

A coating liquid was prepared by dissolving zirconium chloride in ethanol so as to have a zirconium concentration of 1% by mass. The coating liquid was applied to the same base as that used in sample No. 1-1 by a dip coating method, dried at 150° C. until the organic solvent was removed, and then fired in the air at 650° C. for 1 hour.

Sample No. 1-21

A coating liquid was prepared by dissolving CoSO$_4$ in water so as to have a cobalt concentration of 1% by mass, and further adding a fluorine-based surfactant in an amount of 0.5% by mass. The coating liquid was applied to the same base as that used in sample No. 1-1 by a dip coating method, dried at 150° C. until the solvent was removed, and then fired in the air at 650° C. for 1 hour.

Sample No. 1-31

A coating liquid was prepared by dissolving tungsten chloride in ethanol so as to have a tungsten concentration of 1% by mass. The coating liquid was applied to the same base as that used in sample No. 1-1 by a dip coating method, dried at 150° C. until the organic solvent was removed, and then fired in the air at 650° C. for 1 hour.

Sample No. 1-100

The same base as that used in sample No. 1-1 was prepared as a base. In sample No. 1-100, neither application of a coating liquid nor firing after application was performed.

Sample No. 1-111

The same base as that used in sample No. 1-1 was prepared as a base. In sample No. 1-111, carbon nanotubes were grown on carbon fibers by a chemical vapor deposition method (CVD method) (size: 50 nm).

Sample No. 1-112

The same base as that used in sample No. 1-1 was prepared as a base. In sample No. 1-112, carbon black particles (size: 35 nm) were dispersed in ethanol, and a dispersion liquid of a fluorine resin was mixed as a binder, and the resulting mixture was applied to the base and dried to cause the carbon black particles to adhere to the base.

Sample No. 1-113

The surface of the same base as that used in sample No. 1-1 was subjected to a plasma hydrophilic treatment.

[State of Base Surface]

Figure 3A:
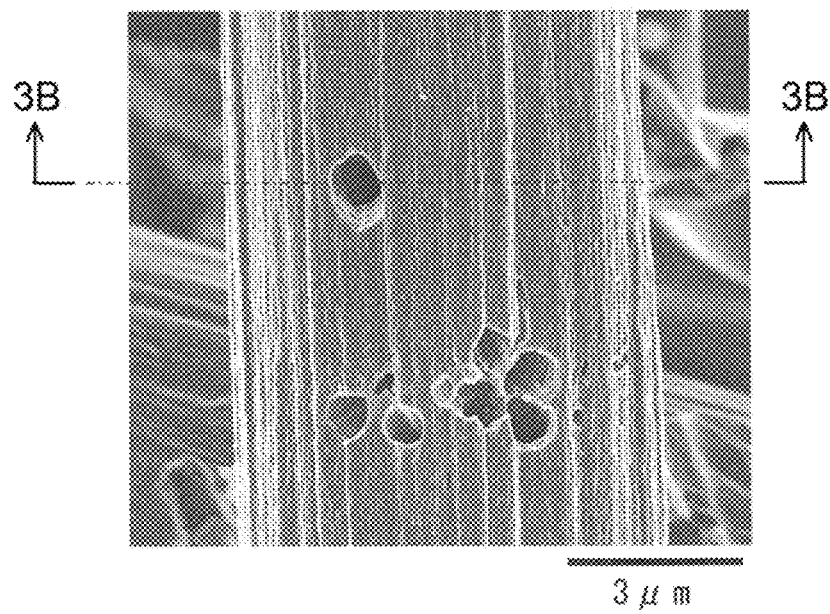
FIG. 3A is a scanning electron micrograph showing a surface of a base of an electrode of sample No. 1-1 in Experimental Example.
Figure 3B:
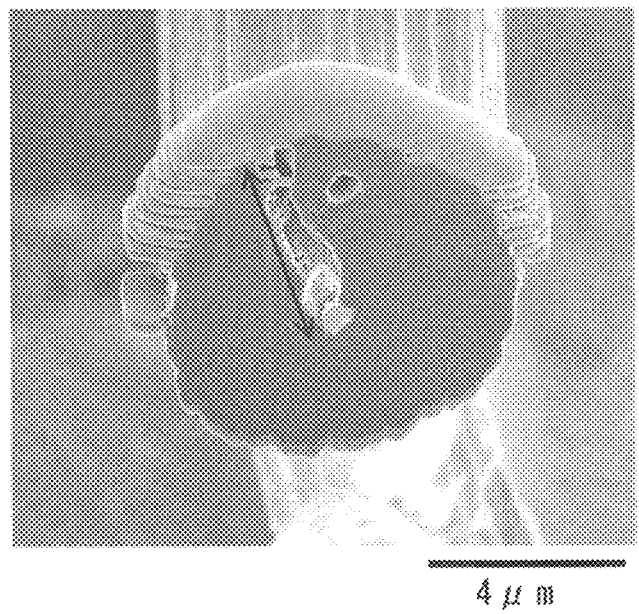
FIG. 3B is a scanning electron micrograph showing a section taken along line 3B-3B in FIG. 3A.
Figure 4A:
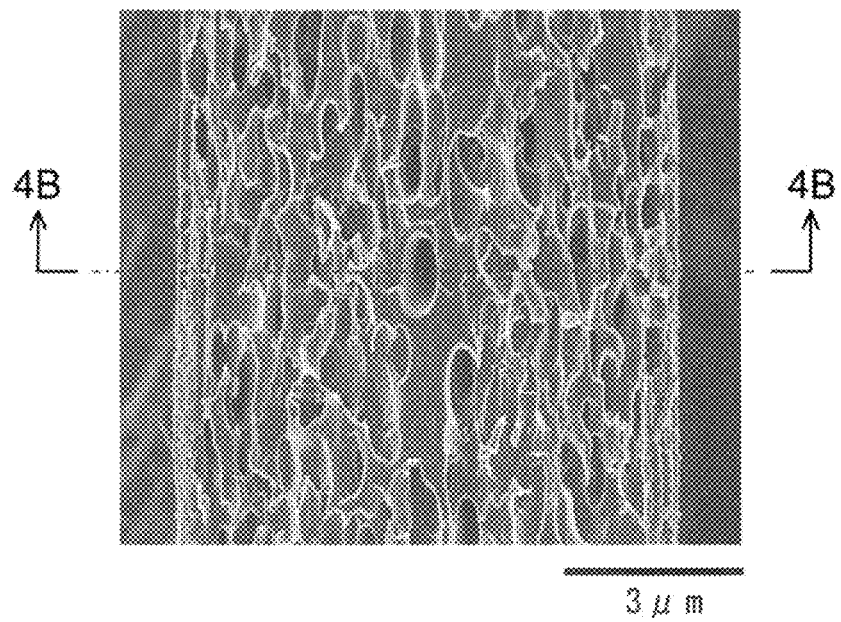
FIG. 4A is a scanning electron micrograph showing a surface of a base of an electrode of sample No. 1-11 in Experimental Example.
Figure 4B:
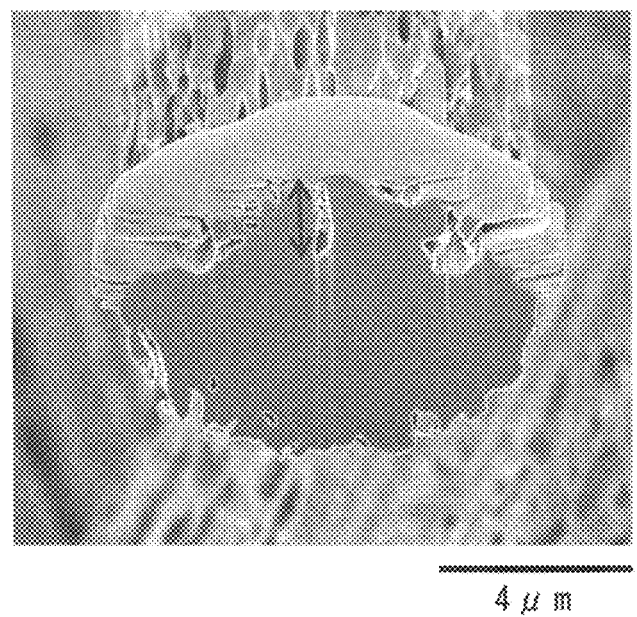
FIG. 4B is a scanning electron micrograph showing a section taken along line 4B-4B in FIG. 4A.

With regard to the electrode of each of the samples obtained as described above, carbon fibers forming the electrode were observed with a scanning electron microscope (SEM). FIG. 3A shows a SEM photograph (magnification: 12,000) of a surface of a carbon fiber that forms the electrode of sample No. 1-1, and FIG. 3B shows a SEM photograph (magnification: 10,000) of a cross section obtained by cutting substantially in the center (in the dotted-chain line portion shown in the SEM photograph of the surface in FIG. 3A) of an opening of a penetrating hole observed on the surface of the carbon fiber. A cross section of a carbon fiber is obtained by subjecting the carbon fiber to a focus ion beam (FIB) process. In this example, the carbon fiber is coated with platinum (Pt) and then subjected to an FIB process. Therefore, a Pt coating film remains on the upper side in the SEM photograph of the cross section of FIG. 3B. Similarly, FIG. 4A shows a SEM photograph (magnification: 12,000) of a surface of a carbon fiber that forms the electrode of sample No. 1-11, and FIG. 4B shows a SEM photograph (magnification: 10,000) of a cross section obtained by cutting substantially in the center (in the dotted-chain line portion shown in the SEM photograph of the surface in FIG. 4A) of an opening of a penetrating hole observed on the surface of the carbon fiber. FIGS. 3A, 3B, 4A, and 4B showed that in each of the electrodes, the carbon fiber (base) had a penetrating hole extending from the surface toward the interior. In addition, FIG. 3B showed that the penetrating hole had a metal oxide at the bottom thereof. It was also confirmed that, in the electrodes of sample Nos. 1-2 to 1-7, 1-21, and 1-31, a carbon fiber (base) had a penetrating hole extending from the surface toward the interior, and a penetrating hole had a metal oxide at the bottom thereof Hole Diameter With regard to the diameter of a penetrating hole, an isoarea equivalent circle diameter of an opening on the surface of a carbon fiber was examined. The penetrating hole is formed, in the process for producing an electrode, by erosion of a metal oxide generated on the surface of a base into the interior of the base by the heat treatment. Therefore, regarding the diameter of the penetrating hole, the diameter of the opening on the surface of the carbon fiber is considered to be substantially maintained along the extension direction. In this example, the isoarea equivalent circle diameter of an opening on the surface of a carbon fiber was determined by a surface observation with a SEM photograph. In the case where a plurality of penetrating holes are in contact with each other, the isoarea equivalent circle diameter was determined as follows. When the diameters of the penetrating holes could be distinguished from each other, the values of the diameters were used. When the boundaries of the penetrating holes could not be distinguished from each other, a value calculated by combining both penetrating holes was used. The isoarea equivalent circle diameter of an opening on the surface of a carbon fiber is defined as the diameter of the penetrating hole and shown in Table 1.

Hole Depth

A depth of a penetrating hole is defined as follows. On a cross section of a carbon fiber, the center of gravity of the carbon fiber is defined as a center C, and a portion of the path along the extension direction of the penetrating hole, the portion being the closest to the center C, is defined as a depth point A. A length D from the surface of the carbon fiber to the depth point A on a straight line connecting the center C and the depth point A is defined as the depth of the penetrating hole (refer to the lower part of FIG. 1). In this example, the depth of a penetrating hole was determined by preparing a cross section near the penetrating hole by an FIB process, and performing surface observation with a SEM photograph. When a plurality of penetrating holes are present in the cross section, the deepest length D was used (for example, in FIGS. 3B and 4B, the penetrating holes marked with the double-sided arrows shown in the SEM photographs of the cross sections were used). The length D is defined as the depth of the penetrating hole and shown in Table 1.

[Initial Performance]

Capacitance

For the electrode of each of the samples described above, a 6-M (molar concentration) aqueous sulfuric acid solution was prepared as an ion solution, the ion solution was supplied to a battery cell of a constructed RF battery, and the capacitance (F/g) of the electrode was measured by cyclic voltammetry while maintaining a state where the electrode was immersed in the ion solution. In the measurement of the capacitance, a potential scanning was repeatedly performed by using a commercially available measurement device between a working electrode and a counter electrode in a range from −0.2 V to 0.2 V at 20 mV/s, and the capacitance was calculated from the weight of the electrode. The results are shown in Table 1.

Cell Resistivity

An RF battery having a single-cell structure was produced by using a positive electrode, a negative electrode, and a membrane. As the positive electrode, an electrode prepared by stacking two electrodes, each of which was the electrode of each sample described above, was used. As the negative electrode, an electrode prepared by stacking two sheets of carbon paper formed of carbon fibers having an R value of the degree of graphitization of 1.5 was used. The carbon paper used as the negative electrode had a fiber diameter (isoarea equivalent circle diameter) of 10 μm, a size of 30 mm×30 mm, a thickness of 0.1 mm, a porosity of 70% by volume, and a weight per unit area of 56 g/m². A manganese-titanium-based electrolyte that included a positive electrolyte containing manganese ions as an active material and a negative electrolyte containing titanium ions as an active material was used as an electrolyte. Since each sample was used in the RF battery having a single-cell structure, the internal resistance of the RF battery is represented as a cell resistivity. For each sample, the battery cell was charged and discharged at a constant current with a current density of 70 mA/cm². In this test, when a predetermined switching voltage was reached, switching was performed from charging to discharging, and a plurality of cycles of charging and discharging were performed. After each cycle of charging and discharging, the cell resistivity (Ω·cm²) was determined for each sample. The cell resistivity was determined by determining an average voltage during charging and an average voltage during discharging in any one cycle of the plurality of cycles, and calculating {(difference between average voltage during charging and average voltage during discharging)/(average current/2)}×cell effective area. A cell resistivity in an electrode immediately after the start of immersion in the electrolyte (the number of days of immersion: 0 days) is defined as an initial cell resistivity and shown in Table 1.

TABLE 1

| Sample No. | Base treatment condition | Heat treatment condition Temperature (° C.) × Time (h) | Hole diameter (nm) | Hole depth (nm) | Cell resistivity (Ω · cm²) | Capacitance (F/g) |
|---|---|---|---|---|---|---|
| 1-1 | Fe-1 mass % | 650° C. × 1 h | 1500 | 3500 | 1.48 | 0.40 |
| 1-2 | Fe-0.1 mass % | 650° C. × 1 h | 200 | 500 | 1.25 | 0.65 |
| 1-3 | Fe-1 mass % + silicon-based surfactant | 650° C. × 1 h | 300 | 500 | 1.18 | 0.70 |
| 1-4 | Fe-1 mass % + fluorine-based surfactant | 650° C. × 1 h | 500 | 1000 | 1.43 | 0.25 |
| 1-5 | Fe-1 mass % + cationic surfactant | 550° C. × 3 h | 1000 | 2000 | 1.60 | 0.19 |
| 1-6 | Fe-1 mass % + anionic surfactant | 600° C. × 2 h | 200 | 300 | 1.52 | 0.22 |
| 1-7 | Fe oxide nanoparticle | 650° C. × 1 h | 60 | 200 | 1.31 | 0.51 |
| 1-11 | Zr-1 mass % | 650° C. × 1 h | 1000 | 1500 | 1.38 | 0.32 |
| 1-21 | Co-1 mass % + fluorine-based surfactant | 650° C. × 1 h | 1500 | 1000 | 1.53 | 0.20 |
| 1-31 | W-1 mass % | 650° C. × 1 h | 100 | 300 | 1.22 | 0.33 |
| 1-100 | Untreated | — | — | — | 2.00 | 0.05 |
| 1-111 | Carbon nanotube | — | — | — | 1.25 | 0.95 |
| 1-112 | Carbon black | — | — | — | 1.15 | 1.50 |
| 1-113 | Plasma hydrophilic treatment | — | — | — | 1.65 | 0.12 |

In each of sample Nos. 1-1 to 1-7, 1-11, 1-21, and 1-31, which were obtained by applying a specific metal element (Fe, Zr, Co, or W) to carbon fibers and performing heat treatment, a penetrating hole having an opening diameter of 60 nm or more and 1,500 nm or less and a depth (length D) of 200 nm or more and 3,500 nm or less was formed on the surface of a carbon fiber. That is, it is found that, on a cross section of a carbon fiber, the path of a penetrating hole is partially present within a reference circle having the center of gravity of the carbon fiber as a center C and having a diameter which is 95%, further 90%, 85%, 75%, 65%, and in particular 50% of the isoarea equivalent circle diameter of the carbon fiber. In particular, in sample No. 1-1, the path of the penetrating hole is found to be partially present near the center of the carbon fiber (within a reference circle having a diameter which is 13% of the isoarea equivalent circle diameter of the carbon fiber). Since the presence of the penetrating holes increases the surface area, the BET specific surface area can be 0.1 $m^2/g$ or more. Consequently, the cell resistivity could be reduced compared with sample No. 1-100, in which no treatment was performed on the carbon fibers. In addition, the capacitance could be increased by the presence of the penetrating holes compared with sample No. 1-100.

In sample Nos. 1-111 and 1-112, in which carbon nanotubes and carbon black particles were caused to adhere to the surfaces of carbon fibers, respectively, although no penetrating holes were formed in the carbon fibers, and in sample No. 1-113, in which a plasma hydrophilic treatment was performed on the surfaces of carbon fibers, since the reaction area was increased, the cell resistivity could be reduced, and the capacitance could be increased.

[Rate of Increase in Cell Resistivity with Time]

A rate of increase in the cell resistivity of an RF battery with time was examined. Table 2 shows the rate of increase in each cell resistivity of each sample after 7 days and after 14 days when the initial cell resistivity shown in Table 1 is assumed as a reference (1.00).

TABLE 2

| Sample No. | Rate of increase in cell resistivity | |
|---|---|---|
| | After 7 days (75° C.) | After 14 days (75° C.) |
| 1-1 | 1.03 | 1.12 |
| 1-2 | 1.06 | 1.15 |
| 1-3 | 1.05 | 1.15 |
| 1-4 | 1.03 | 1.09 |
| 1-5 | 1.03 | 1.08 |
| 1-6 | 1.05 | 1.10 |
| 1-7 | 1.14 | 1.22 |
| 1-11 | 1.07 | 1.12 |
| 1-21 | 1.04 | 1.07 |
| 1-31 | 1.10 | 1.22 |
| 1-100 | 1.00 | 1.10 |
| 1-111 | 1.50 | 1.65 |
| 1-112 | 1.70 | 2.00 |
| 1-113 | 1.20 | 1.32 |

In each of sample Nos. 1-1 to 1-7, 1-11, 1-21, and 1-31, in which a carbon fiber has a penetrating hole extending from the surface toward the interior of the carbon fiber, the rate of increase in the cell resistance is lower than those of sample Nos. 1-111, 1-112, and 1-113, in which a carbon fiber has no penetrating hole. The reason for this is believed to be as follows. Even when carbon fibers were degraded over time and the surfaces thereof were eroded in the operation of the RF battery for a long period of time, the ratio of decrease in the surface area could be reduced because the penetrating holes were partially present even in a region near the center C of each of the carbon fibers. In contrast, in sample Nos. 1-111, 1-112, and 1-113, the cell resistivity was considered to be increased by decreasing the reaction area due to the detachment of the carbon nanotubes or carbon black particles adhering to the surfaces of carbon fibers or the disappearance of the carbon nanotubes or carbon black particles caused by oxidative decomposition in the operation of the RF battery for a long period of time.

The scope of the present invention is not limited to these examples described above but is defined by the appended claims, and is intended to cover all the modifications within the meaning and scope equivalent to those of the claims. For example, in the process for producing an electrode, the shape and the size of the path of a penetrating hole, the path extending along the extension direction of the penetrating hole, can be appropriately changed by changing the type, the concentration, and the amount of coating of the metal in the coating liquid or by changing heat treatment conditions. In addition, the type of electrolyte can be appropriately changed.

The invention claimed is:

1. A redox flow battery electrode comprising an aggregate of a base containing carbon,
   wherein the base includes a plurality of penetrating holes which extend from a surface toward an interior of the base, and the redox flow battery electrode has a capacitance of 0.05 F/g or more.

2. The redox flow battery electrode according to claim 1, wherein the base includes a carbon fiber having a cross section with an isoarea equivalent circle diameter of 3 μm or more and 100 μm or less.

3. The redox flow battery electrode according to claim 1, wherein at least one of the plurality of penetrating holes has an opening on the surface of the base, the opening having an isoarea equivalent circle diameter of 50 nm or more and 2,000 nm or less.

4. The redox flow battery electrode according to claim 1, wherein the redox flow battery electrode has a BET specific surface area of 0.1 $m^2/g$ or more.

5. The redox flow battery electrode according to claim 1, wherein at least one of the plurality of penetrating holes has a metal oxide at a bottom thereof.

6. A redox flow battery that performs charging and discharging by supplying a positive electrolyte and a negative electrolyte to a battery cell that includes a positive electrode, a negative electrode, and a membrane disposed between the positive electrode and the negative electrode,
   wherein the positive electrode is the redox flow battery electrode according to claim 1.

7. A redox flow battery electrode comprising an aggregate of a base containing carbon,
   wherein the base includes a plurality of penetrating holes which extend from a surface toward an interior of the base, and
   wherein at least one of the plurality of penetrating holes extends from the surface to the interior in a meandering manner.

8. A redox flow battery electrode comprising an aggregate of a base containing carbon,
   wherein the base includes a plurality of penetrating holes which extend from a surface toward an interior of the base, and
   wherein at least one of the plurality of penetrating holes extends through the base.

9. The redox flow battery electrode according to claim 7, wherein the base includes a carbon fiber having a cross section with an isoarea equivalent circle diameter of 3 μm or more and 100 μm or less.

10. The redox flow battery electrode according to claim 7, wherein at least one of the plurality of penetrating holes has an opening on the surface of the base, the opening having an isoarea equivalent circle diameter of 50 nm or more and 2,000 nm or less.

11. The redox flow battery electrode according to claim 7, wherein the redox flow battery electrode has a BET specific surface area of 0.1 $m^2$/g or more.

12. The redox flow battery electrode according to claim 7, wherein the redox flow battery electrode has a capacitance of 0.05 F/g or more.

13. The redox flow battery electrode according to claim 7, wherein at least one of the plurality of penetrating holes has a metal oxide at a bottom thereof.

14. A redox flow battery that performs charging and discharging by supplying a positive electrolyte and a negative electrolyte to a battery cell that includes a positive electrode, a negative electrode, and a membrane disposed between the positive electrode and the negative electrode,
wherein the positive electrode is the redox flow battery electrode according to claim 7.

15. The redox flow battery electrode according to claim 8, wherein the base includes a carbon fiber having a cross section with an isoarea equivalent circle diameter of 3 μm or more and 100 μm or less.

16. The redox flow battery electrode according to claim 8, wherein at least one of the plurality of penetrating holes has an opening on the surface of the base, the opening having an isoarea equivalent circle diameter of 50 nm or more and 2,000 nm or less.

17. The redox flow battery electrode according to claim 8, wherein the redox flow battery electrode has a BET specific surface area of 0.1 $m^2$/g or more.

18. The redox flow battery electrode according to claim 8, wherein the redox flow battery electrode has a capacitance of 0.05 F/g or more.

19. The redox flow battery electrode according to claim 8, wherein at least one of the plurality of penetrating holes has a metal oxide at a bottom thereof.

20. A redox flow battery that performs charging and discharging by supplying a positive electrolyte and a negative electrolyte to a battery cell that includes a positive electrode, a negative electrode, and a membrane disposed between the positive electrode and the negative electrode,
wherein the positive electrode is the redox flow battery electrode according to claim 8.

* * * * *